(12) United States Patent
Mazur et al.

(10) Patent No.: US 7,566,827 B2
(45) Date of Patent: Jul. 28, 2009

(54) VARIABLE SLIPPAGE CONTROL FOR A DISK JOCKEY CONTROL SURFACE

(75) Inventors: James Mazur, Ft. Lauderdale, FL (US); Alan Flum, Oakland, CA (US)

(73) Assignee: Stanton Magnetics, Inc., Hollywood, FL (US)

( * ) Notice: Subject to any disclaimer, the term of this patent is extended or adjusted under 35 U.S.C. 154(b) by 2 days.

(21) Appl. No.: 11/586,903

(22) Filed: Oct. 26, 2006

(65) Prior Publication Data

US 2008/0101183 A1 May 1, 2008

(51) Int. Cl.
*G01H 3/00* (2006.01)
*G01H 1/02* (2006.01)
*G11B 25/00* (2006.01)

(52) U.S. Cl. .............. 84/723; 84/662; 84/737; 369/264; 369/266; 369/267; 369/47.38

(58) Field of Classification Search ............ 84/645
See application file for complete search history.

(56) References Cited

U.S. PATENT DOCUMENTS

| 4,256,312 | A | * | 3/1981 | Ikeda | 369/269 |
| 4,304,060 | A | * | 12/1981 | Tanguay | 40/456 |
| 5,519,687 | A | * | 5/1996 | Peeters | 720/710 |
| 6,541,690 | B1 | | 4/2003 | Segers | |
| 6,898,165 | B2 | * | 5/2005 | Kikuchi | 369/53.3 |
| 6,985,418 | B2 | | 1/2006 | Hori | |
| 2004/0228222 | A1 | * | 11/2004 | Huang | 369/19 |
| 2005/0052981 | A1 | * | 3/2005 | Shim et al. | 369/59.26 |

* cited by examiner

*Primary Examiner*—Walter Benson
*Assistant Examiner*—Christopher Uhlir
(74) *Attorney, Agent, or Firm*—Day Pitney LLP

(57) ABSTRACT

The disclosure pertains to a scratch effect controller for use by a disk jockey, wherein at least one electromagnet creates the slippage tension or friction effect between the user manipulated disc, which includes a vinyl-like surface thereby simulating a vinyl record, and the rotatable or fixed platter. The strength of the electromagnet is variable so as to create a variable slippage tension or friction effect.

9 Claims, 5 Drawing Sheets

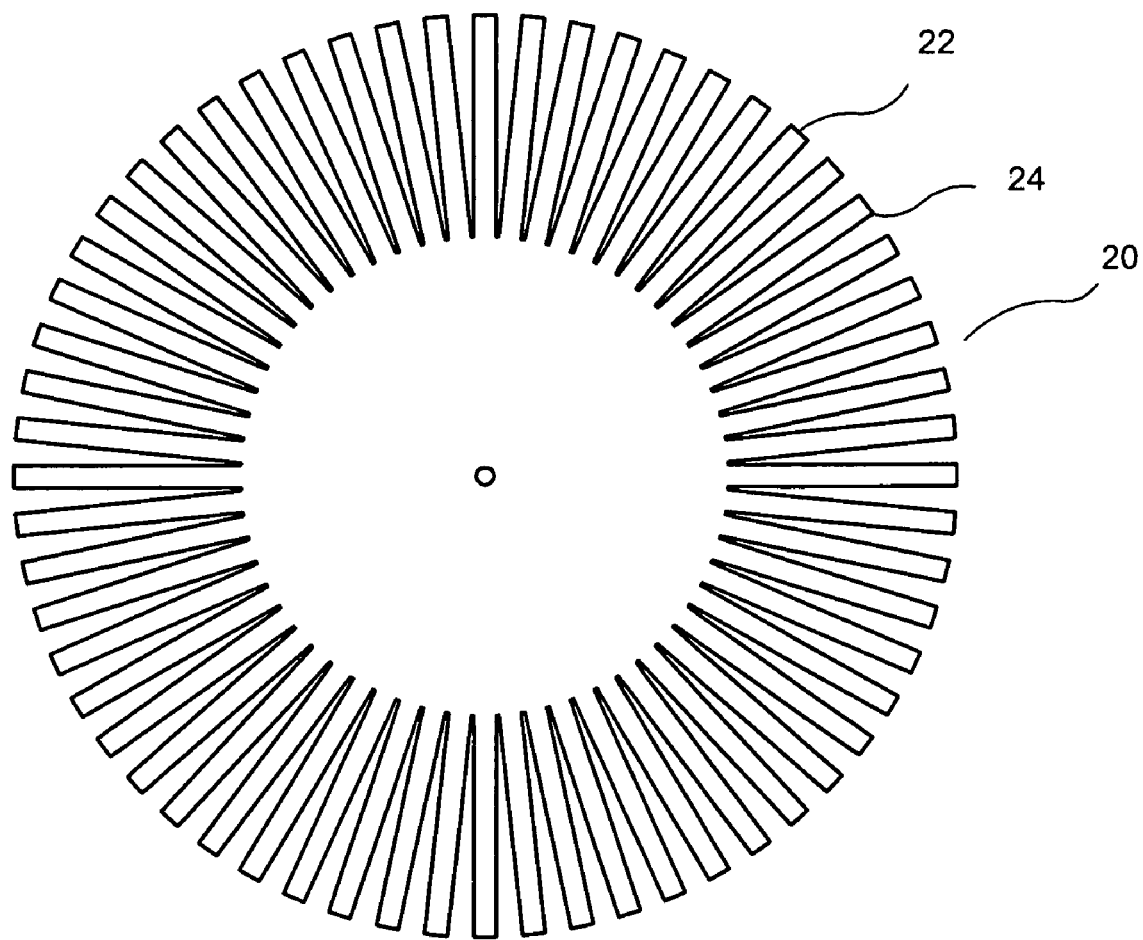
F I G. 3

VARIABLE SLIPPAGE CONTROL FOR A DISK JOCKEY CONTROL SURFACE

BACKGROUND OF THE INVENTION

1. Field of the Invention

The present invention pertains to a device for use by a disk jockey, wherein electromagnets create the variable slippage tension or friction effect between the user manipulated vinyl-like surface (simulating a vinyl record) and the platter, which may be rotatable or fixed.

2. Description of the Prior Art

Disk jockeys (DJs) traditionally entertain their audiences by manipulating the speed and direction of a vinyl record used on phonographic turntables to produce various effects including the well known "scratch effect". The turntable has been replaced by CD players that have jog wheels in the form of a turntable like platters that can be turned by the DJ to produce the scratch effect and simulate other characteristics of manipulating a vinyl record on a traditional phonographic turntable.

An improvement on this is to rotate the platter by means of a motor and to provide a separate vinyl-like surface that the user manipulates. Between the motorized platter and vinyl-like surface is a slip disc made of plastic or felt. As the DJ moves the vinyl record-like surface, the slip disc allows the user to move the record independently of the rotating platter. U.S. Pat. No. 6,985,418 entitled "Optical Disk Reproducing Apparatus" to Hori teaches a device that includes an optical disc player, a user manipulated surface and driven rotating surface where there is some type of encoding mechanism to detect the speed and direction of both the user surface and the rotating surface.

The next evolution beyond the moving platter CD player for DJs is the moving platter computer interface control surface. Many DJs desire to use a phonographic turntable-like control surface to manipulate music on their computer. U.S. Pat. No. 6,541,690 entitled "Scratch Effect Controller" to Segers, for example, teaches such a device that manipulates an audio stream on a personal computer using a device that includes a rotating platter, a user manipulated surface (encoder disc), and a slip disc.

One problem with this combination of motorized platter and vinyl-like surface is cost. It is desirable to have a CD player with some of the characteristics of the vinyl-like surface and motorized platter without the platter being motorized.

Another problem not addressed by any of the prior art is the fact that each user may have a different preference as to the feel of the slippage between the vinyl-like record and the rotating platter. On a traditional phonographic turntable, the user may choose from different various slip discs made from a variety of different materials. This does not always produce the most desirable results. All of the above motorized and non-motorized CD players and DJ control surfaces have a similar limitation.

OBJECTS AND SUMMARY OF THE INVENTION

It is therefore an object of the present invention to provide a device for a disk jockey to create audio effects with a CD player, such as a scratch effect controller, wherein the slippage between the user manipulated surface and the rotatable or fixed platter is varied by a variable slippage control.

These and other objects are attained by providing a scratch effect controller with electromagnets to create the variable slippage tension between the user manipulated surface and the rotatable or fixed platter.

BRIEF DESCRIPTION OF THE DRAWINGS

Further objects and advantages of the invention will become apparent from the following description and from the accompanying drawings, wherein:

FIG. 3 is a possible embodiment of the encoding pattern on the upper surface of the user manipulated disc.

DETAILED DESCRIPTION OF THE PREFERRED EMBODIMENT

Figure 1:
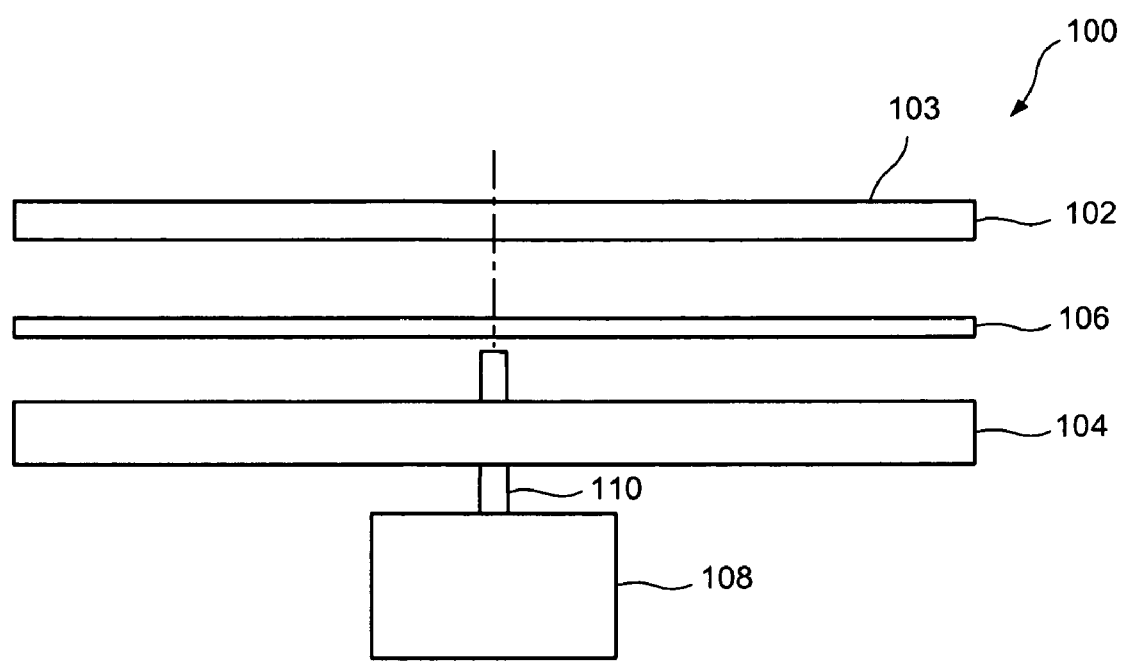
FIG. 1 is a partially exploded schematic of a CD player with a user manipulated surface and a rotating platter, such as is taught in the prior art.

Referring now to the drawings in detail wherein like numerals indicate like elements throughout the several views, one sees that FIG. 1 discloses a typical scratch effect controller 100 of the prior art wherein a user manipulated disc 102 includes an upper surface 103 which simulates a vinyl record. User manipulated disc 102 is mounted on a motor-driven rotating platter 104 with a slip disc or resin sheet 106 therebetween. The slip disc or resin sheet 106 provides for reduced friction between the user manipulated surface 102 and the motor-driven rotating platter 104. Motor 108 drives shaft 110 in concert therewith which drives motor-driven rotating platter 104. Shaft 110 further extends upwardly from motor-driven rotating platter 104 thereby providing an axis to pass through the central apertures (not shown) of user manipulated surface 102 and slip disc or resin sheet 106. A sensor (not shown) detects the movements of user manipulated surface 102.

Figure 2:
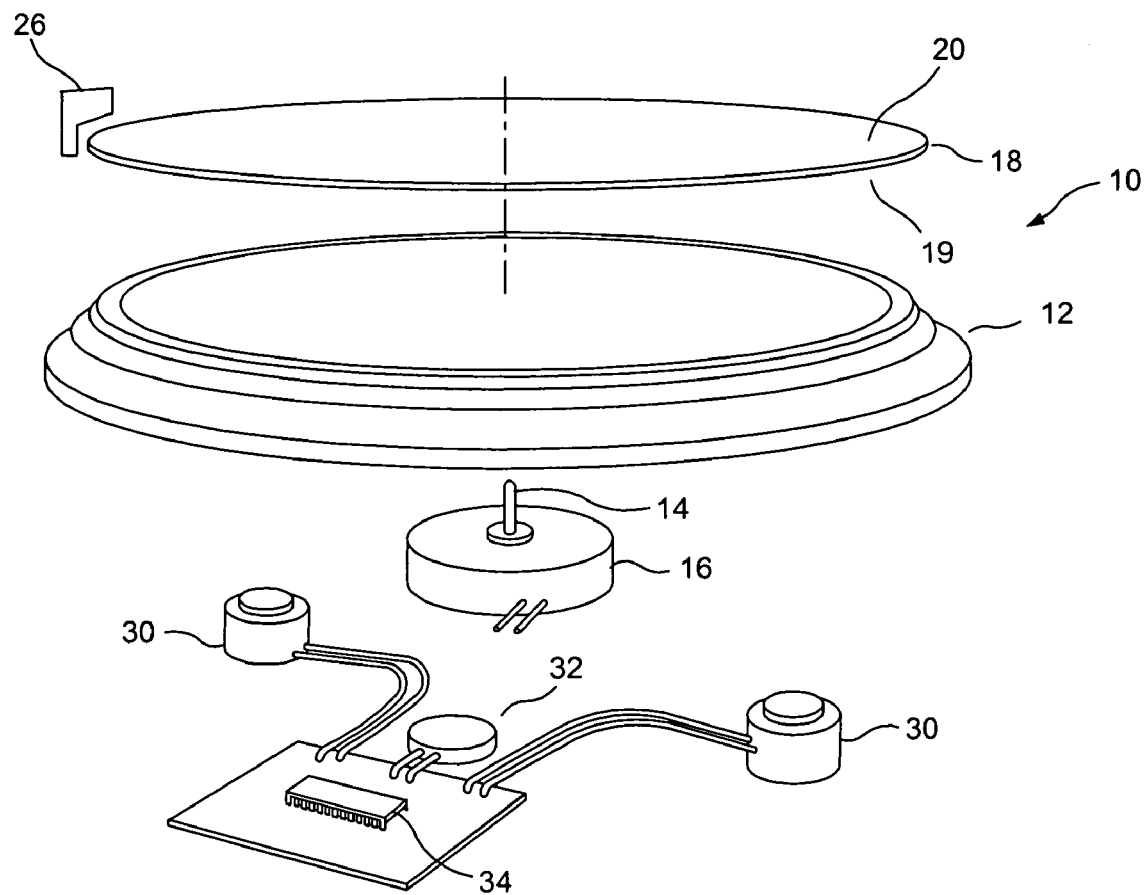
FIG. 2 is a partially exploded perspective view of the scratch controller of the present invention.

The scratch controller 10 of the present invention is illustrated in FIG. 2. Rotating platter 12 is mounted on shaft 14 and typically moves in concert therewith. Shaft 14 may be driven by optional motor 16 or journaled for free rotation. User manipulated disc 18 is supported by and coaxial with rotating platter 12 (rotating platter 12 may have an upwardly extending spindle, not shown, much like a conventional turntable, to receive the central aperture 22 of user manipulated disc 18 shown in FIG. 3). User manipulated disc 18 is made of magnetic material, such as steel, or contains magnetic material, such as pressed vinyl permeated with small particles of magnetic material. Alternately, the surface could be made from injection molded plastic permeated with small particles of ferrous material during the molding process. Typically, the lower surface 19 of user manipulated disc is coated with a low friction material, such as Teflon (polytetrafluoroethylene). The rotating platter 12 typically has substantial rotational inertia so that when optional motor 16 is omitted or is turned off the user can manually initiate rotational motion of rotating platter 12 and subsequently vary the rotational speed of user manipulated disc 18 so as to be different from that of rotating platter 12.

User manipulated disc 18 has an upper surface 20 which simulates the feel of a vinyl record. Upper surface 20 further typically includes a central aperture 22 (see FIG. 3). Upper surface 20 further includes encoding pattern 24, such as is shown in FIG. 3. The typical encoding pattern shown in FIG. 3 is that disclosed in U.S. Pat. No. 6,541,690 entitled "Scratch Effect Controller" issued on Apr. 1, 2003 to Segers, the entire contents of which are hereby incorporated by reference. Those skilled in the art will recognize a broad range of equivalents after review of the present disclosure.

Optical pick up 26 reads the rotating encoding pattern 24 of upper surface 20 of user manipulated disc 18 and transmits the data to a digital system such as that disclosed in the above-identified U.S. Pat. No. 6,541,690 thereby controlling the playback of digitally encoded music in response to the movements of the user manipulated disc 18. The scratch effect may be proportional to the difference between the rotational velocity and a reference rotational velocity (such as that corresponding to 33⅓rpm) or, particularly in the case of the rotating platter 12 not being driven by motor 16, the rotational acceleration of user manipulated disc 18 (deceleration being negative acceleration).

Electromagnets 30 are mounted in a stationary position below rotating platter 12 for increasing a force between the user manipulated disc 18 (which is attracted to the electromagnets) and the rotating platter 12. The strength of electromagnets 30 is adjustable to vary the friction between rotating platter 12 and user manipulated disc 18. The circuitry for adjusting the strength of electromagnets 30 is illustrated in FIG. 4.

Figure 4:
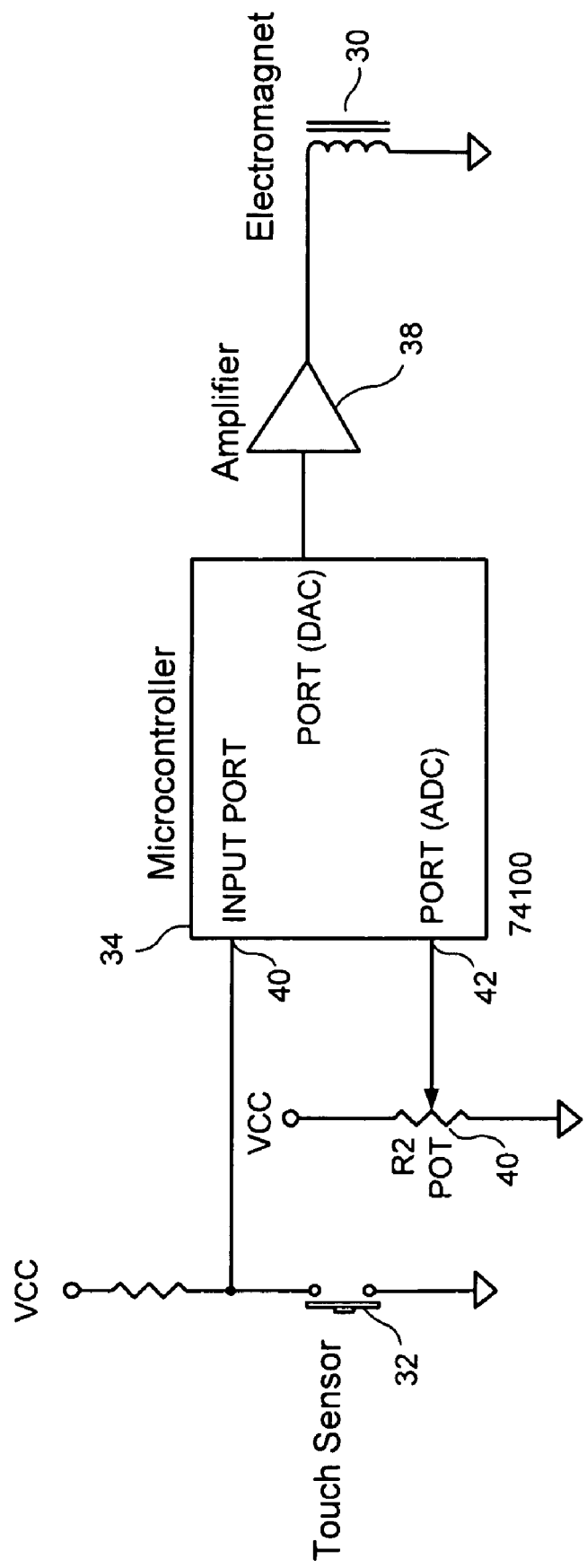
FIG. 4 is a schematic of the control section of the electromagnets of the present invention.

As shown in FIG. 4, detector 32 senses when the DJ or other user touches the user manipulated disc 18. Detector 32 typically could be a tact switch, capacitive detection, reed switch or some other means of touch sensing known to those skilled in the art of electronic design. Detector 32 connects to a microprocessor or microcontroller 34 either directly or through analog or digital circuitry depending on the type of detector. In this disclosed embodiment, tact switch 32 is connected to directly to an input port 36 of microcontroller 34. Microcontroller 34 detects the switch closure, which represents the user touching the surface of the user manipulated disc 18.

Microcontroller acts upon the detection of the switch closure by sending a predetermined signal via an internal digital to analog converter or PWM circuit to the circuit that drives electromagnets 30. This driving circuit may be either an operational amplifier (illustrated as element 38, or transistor circuit, or any other means known to someone familiar with the art, capable of producing sufficient current to produce a strong enough magnetic field in the electromagnets 30 to create the effect of friction, or slippage tension, between the user manipulated disc 18 and rotating platter 12.

The friction can be adjusted by a user manipulated control such as a potentiometer, a switch, or series of switches. In the illustrated embodiment of FIG. 4, the user manipulated control is a potentiometer 40 which is connected to a port 42 of the microcontroller 34 which contains an analog to digital converter. The analog to digital converter creates a digital signal that corresponds to the position of the potentiometer 40 (i.e. the voltage on the output of the potentiometer). Microcontroller 34 uses this information to send out a predetermined signal to electromagnets 30 when the user manipulated disc 18 is touched (in this case, the tact switch 32 is closed).

Figure 5:
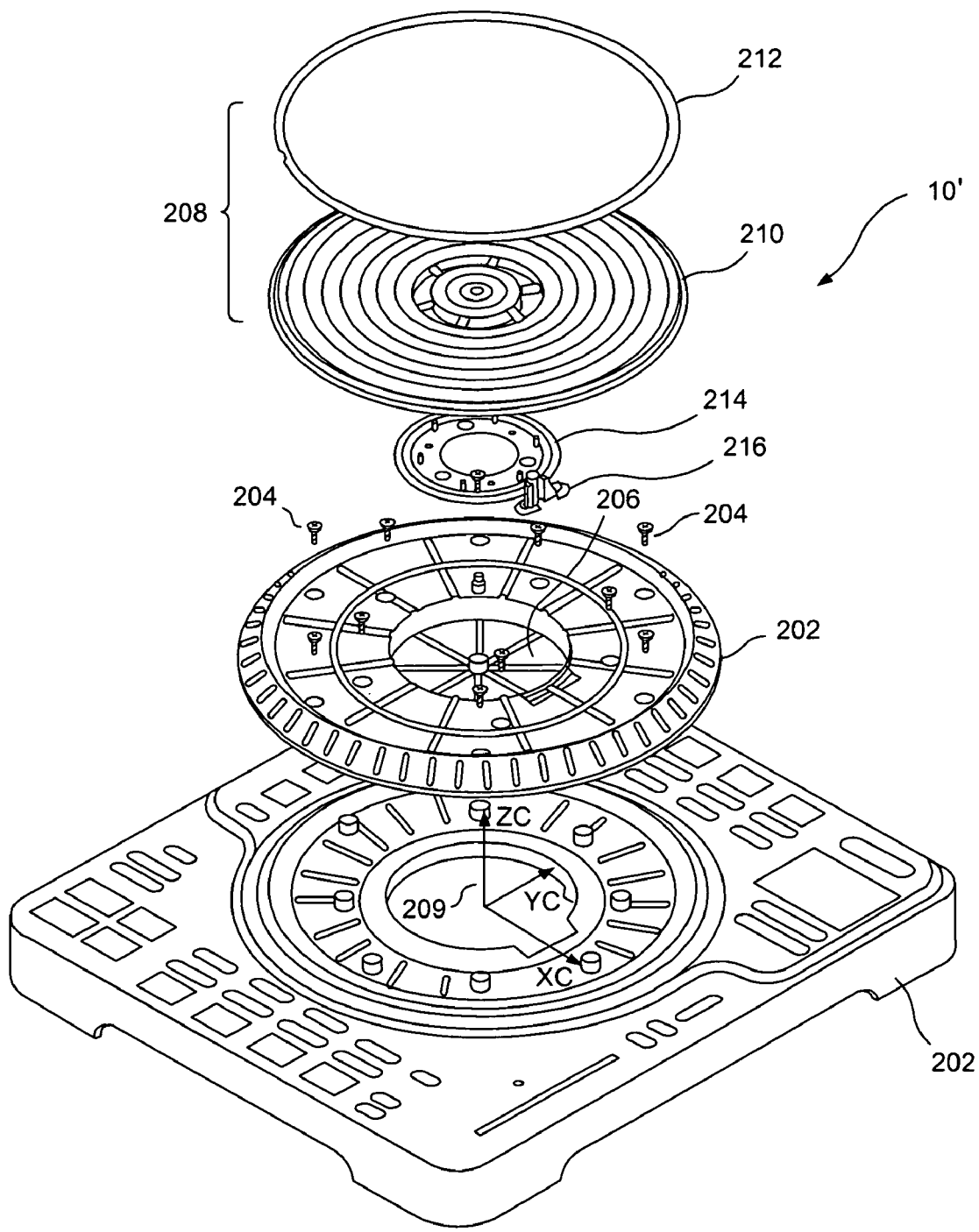
FIG. 5 is an exploded perspective view of an alternative embodiment of the scratch controller of the present invention including a fixed platter.

FIG. 5 is an exploded schematic of an alternative embodiment of the scratch controller 10' of the present invention. Scratch controller 10' includes a base 200 much like a conventional turntable. Platter 202 is fixed into place by screws 204 (or similar attachment devices or methods) on base 200 and does not rotate. Platter 204 includes central chamber 206 about the center thereof. User manipulated disc 208 rotates within platter 204 about an axis 209 and includes lower structural disc 210 and upper vinyl-like surface 212 glued thereto. The lower surface of user manipulated disc 208 may include polytetrafluoroethylene or a similar low friction material. Encoding disc 214 with encoding pattern is fixed to the underside of lower structural disc 210 and fits within central chamber 206 of fixed platter 204. Optical pick up 216 is secured to fixed platter 204 and measures the rotational velocity (from which rotational acceleration can be derived). Electromagnets (not shown) can be embedded in fixed platter 204 or inserted fixed underneath fixed platter 204 in order to perform the function of electromagnets 30 in FIG. 2. The electromagnets in this embodiment are driven by the circuit illustrated in FIG. 4 and described herein.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A device for producing scratch effects in a digitized audio signal, comprising:
    a rotating platter which is free of motor driving;
    a user manipulated disc including magnetic material, said user manipulated disc impinging against said rotating platter, rotating about a common axis and being free of motor driving; and
    at least one electromagnet spaced and with polarity oriented with respect to said user manipulated disc for attracting said user manipulated disc thereby increasing a force urging said user manipulated disc against said rotating platter.

2. The device of claim 1 further including a circuit for varying magnetic strength of said at least one electromagnet.

3. The device of claim 2 wherein an upper surface of said user manipulated disc simulates a vinyl record.

4. The device of claim 3 wherein said upper surface of said user manipulated disc includes an encoding pattern.

5. The device of claim 4 further including a detector for detecting motion of said user manipulated disc and producing a scratch effect in response thereto.

6. The device of claim 5 wherein said rotating platter has rotational inertia sufficient for a user to vary a rotational speed of said user manipulated disc to be different from a rotational speed of said rotating platter.

7. The device of claim 6 wherein a lower surface of said user manipulated disc includes polytetrafluoroethylene.

8. The device of claim 5 wherein the scratch effect produced is proportional to rotational acceleration of said user manipulated disc.

9. The device of claim 1 wherein the device communicates with a computer or processor.

* * * * *